(12) United States Patent
Fujino et al.

(10) Patent No.: US 9,223,158 B2
(45) Date of Patent: Dec. 29, 2015

(54) OPTICAL WAVEGUIDE ELEMENT AND METHOD OF MANUFACTURING THE SAME

(75) Inventors: Tetsuya Fujino, Chiyoda-Ku (JP); Masanao Kurihara, Tokyo (JP); Takashi Shinriki, Tokyo (JP); Toru Sugamata, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 12 days.

(21) Appl. No.: 14/233,709

(22) PCT Filed: Jul. 19, 2012

(86) PCT No.: PCT/JP2012/068277
§ 371 (c)(1),
(2), (4) Date: May 8, 2014

(87) PCT Pub. No.: WO2013/012023
PCT Pub. Date: Jan. 24, 2013

(65) Prior Publication Data
US 2014/0254972 A1    Sep. 11, 2014

(30) Foreign Application Priority Data

Jul. 19, 2011 (JP) ................................. 2011-157355
Sep. 30, 2011 (JP) ................................. 2011-218429

(51) Int. Cl.
*G02F 1/035* (2006.01)
*G02B 6/12* (2006.01)
*G02F 1/01* (2006.01)

(52) U.S. Cl.
CPC ........ *G02F 1/035* (2013.01); *G02B 2006/1204* (2013.01); *G02B 2006/1218* (2013.01);

(Continued)

(58) Field of Classification Search
CPC ... G02F 1/035; G02F 1/0123; G02F 2201/07; G02F 2202/06; G02F 2202/20; G02B 2006/1204; G02B 2006/1218
See application file for complete search history.

(56) References Cited

U.S. PATENT DOCUMENTS 5,404,412 A * 4/1995 Seino et al. ....................... 385/2
5,479,552 A   12/1995 Kitamura et al.
(Continued)

FOREIGN PATENT DOCUMENTS

JP    5-257105 A    10/1993
JP    7-64126 A      3/1995
(Continued)

OTHER PUBLICATIONS

Korotky, Steven K., et al., "An RC Network Analysis of Long Term Ti:LiNbO3 Bias Stability," Journal of Lightwave Technology, vol. 14, No. 12, Dec. 1996, pp. 2687-2689.

*Primary Examiner* — Ryan Lepisto
*Assistant Examiner* — Guy Anderson
(74) *Attorney, Agent, or Firm* — Taft, Stettinius & Hollister LLP

(57) ABSTRACT

An object of the present invention is to provide a manufacturing method of an optical waveguide element whose DC drift is suppressed, and to provide a manufacturing method of an optical waveguide element, capable of adjusting DC drift in the middle of manufacturing processes so as to improve a fabrication yield. The method of manufacturing an optical waveguide element comprises a step of forming an optical waveguide in a substrate having an electro-optic effect, a step of forming a buffer layer, and a step of forming an electrode, in which one stage or a plurality of stages of an interface diffusion layer heat adjustment step (S1, S2) for adjusting a concentration distribution of a specific substance in the buffer layer by heating is included after the buffer layer is formed.

2 Claims, 17 Drawing Sheets

(52) U.S. Cl.
CPC ........... *G02F1/0123* (2013.01); *G02F 2201/07* (2013.01); *G02F 2202/06* (2013.01); *G02F 2202/20* (2013.01); *G02F 2203/21* (2013.01)

(56) References Cited

U.S. PATENT DOCUMENTS

| | | | |
|---|---|---|---|
| 5,526,448 | A | 6/1996 | Nagata et al. |
| 5,679,291 | A | 10/1997 | Hakogi |
| 5,680,497 | A * | 10/1997 | Seino et al. .................... 385/129 |
| 5,687,265 | A * | 11/1997 | Nishimoto et al. ............. 385/40 |
| 6,522,792 | B1 * | 2/2003 | Sugamata et al. ................ 385/2 |
| 7,009,758 | B2 * | 3/2006 | Ichikawa et al. .............. 359/321 |
| 7,324,257 | B2 * | 1/2008 | McBrien et al. ............... 359/245 |
| 7,408,693 | B2 * | 8/2008 | Kissa et al. .................... 359/245 |
| 7,418,173 | B2 * | 8/2008 | Abe et al. ......................... 385/40 |
| 7,856,156 | B2 * | 12/2010 | Sayyah et al. .................... 385/2 |
| 8,774,565 | B2 * | 7/2014 | Kissa et al. ........................ 385/2 |
| 2003/0133637 | A1 * | 7/2003 | Bao et al. .......................... 385/2 |
| 2003/0133638 | A1 * | 7/2003 | Jin et al. ............................ 385/2 |
| 2006/0233288 | A1 * | 10/2006 | Gruijters et al. ............... 375/343 |
| 2007/0116475 | A1 * | 5/2007 | McBrien et al. ............... 398/164 |
| 2008/0069491 | A1 * | 3/2008 | Kissa et al. ........................ 385/2 |
| 2010/0046878 | A1 * | 2/2010 | Sayyah et al. .................... 385/2 |
| 2010/0086252 | A1 * | 4/2010 | Kinpara et al. ................... 385/2 |
| 2014/0270617 | A1 * | 9/2014 | Muller et al. ..................... 385/3 |

FOREIGN PATENT DOCUMENTS

| | | |
|---|---|---|
| JP | 7-128624 A | 5/1995 |
| JP | 8-194196 A | 7/1996 |
| JP | 3001027 B2 | 1/2000 |
| JP | 2001-133743 A | 5/2001 |
| JP | 3544020 B2 | 7/2004 |
| JP | 2007-199500 A | 8/2007 |

* cited by examiner

OPTICAL WAVEGUIDE ELEMENT AND METHOD OF MANUFACTURING THE SAME

TECHNICAL FIELD

The present invention relates to an optical waveguide element and a method of manufacturing the same, and particularly to an optical waveguide element in which an optical waveguide, a buffer layer, and electrodes are formed on a substrate having an electro-optic effect, and which improves a drift phenomenon and to a method of manufacturing the same.

BACKGROUND ART

An optical waveguide element using a substrate with an electro-optical effect of lithium niobate (hereinafter, abbreviated to LN) or the like has features in which a loss is smaller, an operation can be performed at a higher speed, and characteristics are more stable in a wide wavelength range than a semiconductor modulator. Therefore, the optical waveguide element is widely used, particularly, in a high speed optical communication system such as a wavelength multiplex optical transmission system.

In order to use the optical waveguide element in an actual system, a structure is necessary in which shift (temperature drift) of an operation point which changes due to a temperature variation or shift (DC drift) of an operation point due to long term DC voltage application is compensated for by using a feedback circuit. For this reason, several countermeasures for reducing an amount of the shift as much as possible have been implemented.

For example, as shown in PTL 1, a technique, in which influence of stress of an electrode or the like on the temperature drift is reduced through annealing, is disclosed. In addition, as shown in PTL 2, a technique, in which a buffer layer is doped with an impurity such as In so as to reduce the DC drift, is disclosed. However, the operation point shift of the LN modulator is influenced by an extremely delicate balance of stress, or a very small amount of impurity included in a crystal or a buffer layer and a balance thereof. Therefore, although various countermeasures including the above-described techniques have been proposed, it has not been realized yet to completely suppress the temperature drift and the DC drift of the optical waveguide element.

On the other hand, an optical waveguide element such as an LN optical modulator is required to be operated at a higher speed and to be driven at a lower voltage due to an increase in a desired transmission capacity. In addition, the optical waveguide element is required not only to perform relative simple intensity modulation such as an NRZ format but also to support a format in which a phase or polarization information can be transmitted simultaneously such as a DQPSK or a polarization multiplexing modulator. For this reason, a substrate configuration of the optical waveguide element becomes complicated such as a ridge structure or a thin plate structure, and a waveguide configuration also becomes complicated from a single Mach-Zehnder type to a nest type.

In accordance therewith, compensation of the above-described operation point shift using a feedback circuit also becomes complicated. Particularly, an optical waveguide element whose DC drift is reduced is desired to be able to control and compensate with lower voltage for the DC drift which is the essence of ensuring a long term operation.

Furthermore, on the other hand, in producing and supplying an optical waveguide element whose DC drift is suppressed to a low level, it is necessary to confirm corresponding characteristics would be satisfied with a system requirement specification by evaluating the DC drift and the like on a wafer in which elements are completed or by chips cut out of the wafer and selecting at a final inspection of a complicated wafer process. Typically, in a case where a wafer or a chip is defective in this stage, the wafer or the chip is discarded, and thus a cost loss due to a decrease in production yield occurs. This is because, if once the wafer process is completed, a wafer or a chip is just used or discarded by good or bad judgment for the finished product, and there is no technique for correcting or adjusting DC drift characteristics with additional adjustment after a wafer is completed, for example, in consideration of an evaluation result of a chip.

A mechanism of the DC drift is described by an equivalent circuit inside an optical waveguide element such as an LN modulator, for example, as in NPL 1. The important matter in this way is that a combined resistance of all of partial resistance values and a combined capacitance of all of partial electric capacitances and ratios of a resistance and a capacitance in each part in the direction of cross-section or surface of an optical waveguide, a buffer layer, a semiconductive film (a Si film or the like), and electrodes which are formed on an LN substrate have influence on long term shift of the DC drift. Therefore, in order to further reduce the DC drift, it is necessary to manufacture by accurately controlling resistances or capacitances in the direction of cross-section-and the surface of the LN substrate, the buffer layer, the semiconductive film, and the like, which are determined in each process, in addition to design of an electrode or a waveguide.

However, the LN material which is ferroelectric has lower crystallinity than a Si wafer or the like of a semiconductor and has a problem in which a variation is large depending on a manufacturer, a manufacturing lot, a manufacturing device, and the like. Variations of resistances in the direction of the cross-sectional or the surface are also large. Further, the resistance values thereof fluctuates to an extent in which a digit considerably changes just only by including a very small amount of impurity in a buffer layer or a semiconductor film which is formed in a wafer process. For this reason, it is very difficult to manufacture with accurately controlling resistances or capacitances in the direction of cross-section and the surface of the LN substrate, the buffer layer, the Si film, and the like, which are determined in each process during manufacturing of the LN modulator. Therefore, the DC drift of the optical waveguide element has some variation.

In addition, as a factor to make it more difficult to suppress reduction or variation of the DC drift, it is very difficult or substantially impossible to measure separately each resistances or capacitances or divide into each resistances or capacitances in the direction of the cross-section and the surface of the LN substrate, the buffer layer, the Si film, and the like, which are determined in each process. Accordingly, there is no realistic means except that the resistances or the capacitances are analogized from a combined resistance value and a combined capacitance of elements on a wafer during the process or of cut-out chips, a tendency or a degree of DC drift, and the like.

Therefore, the once finished wafer is only selected whether to transfer to a product assembly process or to discard by determining good or bad on the basis of characteristic evaluation of elements on a wafer or a cut-out chip.

FIG. 13 is a cross-sectional view illustrating a part of an optical waveguide element, in which an optical waveguide 12 is formed by forming a thermal diffusion portion of Ti and the like in a substrate 11 having an electro-optic effect. A signal electrode 13 and a ground electrode 14 are disposed near the optical waveguide 12 as a modulation electrode for applying an electric field to the optical waveguide.

In order to reduce a DC drift phenomenon, in PTL 3, it is proposed to stabilize characteristics by inserting the film for suppressing diffusion of Li between the substrate and the buffer layer as it is considered that Li from a substrate becomes a movable ion in a buffer layer as a factor of occurring the DC drift phenomenon.

In addition, in PTL 4, a contamination source which is entered from outside of an optical waveguide element is considered as a factor of the DC drift, and a method of forming a protective film on a buffer layer has been proposed in order to prevent a contamination source from entering the buffer layer.

Further, in PTL 5, stabilizing a DC drift characteristic is carried out by controlling an OH amount in a substrate or a buffer layer by doing annealing treatment in a dried gas atmosphere of oxygen.

However, in the technique related to PTL 3 or 4, a diffusion suppression layer or a protective layer is used to prevent penetration of an impurity which may become a movable ion, from the substrate or the outside mainly. These films are required to use the material in which a diffusion coefficient is small and it is hard to occur ion polarization, in order to show an effect thereof. For this reason, metal or semiconductor is mainly used as the material. If these kinds of materials are laid between the substrate in which an optical waveguide is formed and the buffer layer thereon, it becomes the cause to deteriorate characteristics like an optical loss or extinction ratio in the optical waveguide element due to refractive index or a light absorption effect of those materials.

In addition, similarly, also in a case where the material is laid on the buffer layer, there is a possibility that a propagation loss of a signal in the signal electrode or the like-or deterioration of applying efficiency of an electric field may cause. Therefore, this causes characteristics of the optical waveguide element to deteriorate. Further, a countermeasure like partially installed or so may be taken to prevent deterioration of the characteristics, but, in this case, pattern forming and the like using a technique of lithography and the like is required. Therefore, it makes a problem which productivity is poor.

In addition, there is a method of implanting an impurity into a buffer layer in order to reduce a resistance value of the buffer layer or to control the film quality. However, in this technique, the balance with a substrate or an electrode is problematic, it is difficult to stabilize characteristics because it is required to do its control strictly in case doing characteristic stabilization as an actual device.

CITATION LIST

Patent Literature

[PTL 1] Japanese Patent No. 3544020
[PTL 2] Japanese Patent No. 3001027
[PTL 3] Japanese Unexamined Patent Application Publication No. H7-64126
[PTL 4] Japanese Unexamined Patent Application Publication No. 2001-133743
[PTL 5] Japanese Unexamined Patent Application Publication No. H7-128624

Non Patent Literature

[NPL 1] Steven K. Korotky et al., "An RC Network Analysis of Long Term Ti:LiNbO$_3$ Bias Stability", Journal of Lightwave technology, Vol. 14, No. 12, p. 2687 to 2689, IEEE, December 1996

SUMMARY OF INVENTION

Technical Problem

An object of the present invention is to solve the above-described problems and to provide an optical waveguide element whose DC drift is suppressed and a method of manufacturing the same. Particularly, there is provided a method of manufacturing an optical waveguide element, enabling DC drift to be adjusted in the middle of a manufacturing process, thereby improving a fabrication yield. In addition, there are provided an optical waveguide element and a method of manufacturing the same, capable of stabilizing DC drift, not making difficulty in production process, and controlling to be able to control characteristics of a product with high accuracy.

Solution to Problem

In order to solve the above-described problems, the present invention has the following technical features.
(1) A method of manufacturing an optical waveguide element comprises a step of forming an optical waveguide in a substrate having an electro-optic effect, a step of forming a buffer layer, and a step of forming an electrode, in which one stage or a plurality of stages of interface diffusion layer heat adjustment step for adjusting a concentration distribution of a specific substance in the buffer layer by heating is included after the buffer layer is formed.
(2) In the method of manufacturing an optical waveguide element according to the above (1), the interface diffusion layer heat adjustment step is performed when an optical waveguide element is present on a wafer substrate or after an optical waveguide element is cut out of a wafer substrate.
(3) In the method of manufacturing an optical waveguide element according to the above (1), the interface diffusion layer heat adjustment step includes a first interface diffusion layer heat adjustment step which is performed in a step of forming an optical waveguide element on a wafer substrate and a second interface diffusion layer heat adjustment step which is performed when the optical waveguide element is present on the wafer substrate or after the optical waveguide element is cut out of the wafer substrate.
(4) In the method of manufacturing an optical waveguide element according to any one of the above (1) to (3), a predetermined characteristic value of an optical waveguide element is measured, and then the interface diffusion layer heat adjustment step is adjusted on the basis of the measured value.
(5) In the method of manufacturing an optical waveguide element according to the above (3), a heating temperature in the first interface diffusion layer heat adjustment step is higher than a heating temperature in the second interface diffusion layer heat adjustment step.
(6) In the method of manufacturing an optical waveguide element according to any one of the above (1) to (5), the substrate is made of lithium niobate, and the specific substance is Li.
(7) In the method of manufacturing an optical waveguide element according to the above (6), a concentration distribution of Li in the buffer layer in a direction normal to a substrate surface is such that a concentration of $1 \times 10^{16}$ (atoms/cm$^3$) to $3 \times 10^{21}$ (atoms/cm$^3$) is distributed in a range of 1 μm or less.

(8) An optical waveguide element comprises a substrate having an electro-optic effect, an optical waveguide formed in the substrate, a buffer layer formed on the optical waveguide and made mainly from $SiO_2$, and a modulation electrode formed on the buffer layer and modulating light waves which propagate through the optical waveguide, in which the buffer layer has a region which contain Li of $1\times10^{21}$ (atoms/cm$^3$) or more at the substrate side of the buffer layer.

(9) In the optical waveguide element according to the above (8), a thickness of the region which contains Li of $1\times10^{21}$ (atoms/cm$^3$) or more in the buffer layer is a quarter or more of a thickness of the buffer layer.

(10) In the optical waveguide element according to the above (8) or (9), the buffer layer is doped with at least one of In and Ti.

(11) A method of manufacturing an optical waveguide element comprises a substrate having an electro-optic effect, an optical waveguide formed in the substrate, a buffer layer formed on the optical waveguide and made mainly from $SiO_2$, and a modulation electrode formed on the buffer layer and modulating light waves which propagate through the optical waveguide, in which after at least the buffer layer is formed, the buffer layer is subjected to thermal treatment at 400° C. to 1000° C. mainly in an oxygen atmosphere so as to have a region which contains Li of $1\times10^{21}$ (atoms/cm$^3$) or more at the substrate side of the buffer layer.

(12) In the method of manufacturing the optical waveguide element according to the above (11), the buffer layer is subjected to the thermal treatment in the atmosphere in which a material including Li is placed.

(13) A method of manufacturing an optical waveguide element comprises a substrate having an electro-optic effect, an optical waveguide formed in the substrate, a buffer layer formed on the optical waveguide and made mainly from $SiO_2$, and a modulation electrode formed on the buffer layer and modulating light waves which propagate through the optical waveguide, in which when the buffer layer is formed in a vacuum film formation method, a film formation material is mixed with a material including Li so that a content of Li in the buffer layer is $1\times10^{21}$ (atoms/cm$^3$) or more.

Advantageous Effects of Invention

According to the invention related to the above (1), a method of manufacturing an optical waveguide element comprises a step of forming an optical waveguide in a substrate having an electro-optic effect, a step of forming a buffer layer, and a step of forming an electrode, in which one stage or a plurality of stages of interface diffusion layer heat adjustment step for adjusting a concentration distribution of a specific substance in the buffer layer by heating is included after the buffer layer is formed. Therefore, DC drift of the optical waveguide element can be adjusted by the interface diffusion layer heat adjustment step, thereby also improving a production yield.

According to the invention related to the above (2), the interface diffusion layer heat adjustment step is performed when an optical waveguide element is present on a wafer substrate or after an optical waveguide element is cut out of a wafer substrate. Therefore, DC drift of the optical waveguide element can be adjusted even in circumstances close to a final stage of a product, thereby further improving a production yield.

According to the invention related to the above (3), the interface diffusion layer heat adjustment step includes a first interface diffusion layer heat adjustment step which is performed in a step of forming an optical waveguide element on a wafer substrate and a second interface diffusion layer heat adjustment step which is performed when the optical waveguide element is present on the wafer substrate or after the optical waveguide element is cut out of the wafer substrate. Therefore, DC drift of the optical waveguide element can be adjusted in multiple stages, and thus it is possible to more efficiently suppress the occurrence of DC drift.

According to the invention related to the above (4), a predetermined characteristic value of an optical waveguide element is measured, and then the interface diffusion layer heat adjustment step is adjusted on the basis of the measured value. Therefore, it is possible to perform adjustment based on characteristics of the optical waveguide element.

According to the invention related to the above (5), a heating temperature in the first interface diffusion layer heat adjustment step is higher than a heating temperature in the second interface diffusion layer heat adjustment step. Therefore, it is possible to adjust DC drift most effectively in each step.

According to the invention related to the above (6), the substrate is made of lithium niobate, and the specific substance is Li. Therefore, DC drift occurring when the lithium niobate substrate is used can be effectively suppressed by diffusion of Li occurring when the substrate is heated.

According to the invention related to the above (7), a concentration distribution of Li in the buffer layer in a direction normal to a substrate surface is such that a concentration of $1\times10^{16}$ (atoms/cm$^3$) to $3\times10^{21}$ (atoms/cm$^3$) is distributed in a range of 1 μm or less. Therefore, DC drift can be effectively suppressed by the interface diffusion layer heat adjustment step in the middle of manufacturing steps.

According to the invention related to the above (8), an optical waveguide element comprises a substrate having an electro-optic effect, an optical waveguide formed in the substrate, a buffer layer formed on the optical waveguide and made mainly from $SiO_2$, and a modulation electrode formed on the buffer layer and modulating light waves which propagate through the optical waveguide, in which the buffer layer has a region which contains Li of $1\times10^{21}$ (atoms/cm$^3$) or more at the substrate side of the buffer layer. Therefore, bonding of Li—O is strengthened, and thus movement of Li due to an electric field is suppressed and DC drift is reduced. Accordingly, it is possible to stabilize DC drift. In addition, since Li is contained through thermal treatment, a content of Li can be easily controlled by adjusting a temperature. Therefore, manufacturing steps are not complicated, and characteristics of a product can also be controlled with high accuracy.

According to the invention related to the above (9), a thickness of the region which contains Li of $1\times10^{21}$ (atoms/cm$^3$) or more in the buffer layer is a quarter or more of a thickness of the buffer layer. Therefore, it is possible to more reliably realize stabilization of DC drift.

According to the invention related to the above (10), the buffer layer is doped with at least one of In and Ti. Therefore, a resistance value of the buffer layer can be reduced, and thus it is possible to further stabilize DC drift.

According to the invention related to the above (11), a method of manufacturing an optical waveguide element comprises a substrate having an electro-optic effect, an optical waveguide formed in the substrate, a buffer layer formed on the optical waveguide and made mainly from $SiO_2$, and a modulation electrode formed on the buffer layer and modulating light waves which propagate through the optical waveguide, in which after at least the buffer layer is formed, the buffer layer is subjected to thermal treatment at 400° C. to 1000° C. mainly in an oxygen atmosphere so as to have a region which contains Li of $1\times10^{21}$ (atoms/cm$^3$) or more at the substrate side of the buffer layer. Therefore, only by controlling a temperature of thermal treatment, a content of Li in the buffer layer can be controlled with high accuracy without complicating manufacturing steps, and thus it is possible to provide an optical waveguide element whose DC drift has stable characteristics.

According to the invention related to the above (12), the buffer layer is subjected to the thermal treatment in the atmosphere in which a material including Li is placed. Therefore, Li can also be prompted to penetrate into the buffer layer from the surface of the buffer layer, and thus it is possible to efficiently manufacture an optical waveguide element whose DC drift has stable characteristics.

According to the invention related to the above (13), a method of manufacturing an optical waveguide element comprises a substrate having an electro-optic effect, an optical waveguide formed in the substrate, a buffer layer formed on the optical waveguide and made mainly from $SiO_2$, and a modulation electrode formed on the buffer layer and modulating light waves which propagate through the optical waveguide, in which when the buffer layer is formed in a vacuum film formation method, a film formation material is mixed with a material including Li so that a content of Li in the buffer layer is $1\times10^{21}$ (atoms/cm$^3$) or more. Therefore, Li can be contained in advance when the buffer layer is formed, and thus manufacturing steps can be simplified and it is possible to efficiently manufacture an optical waveguide element whose DC drift has stable characteristics.

DESCRIPTION OF EMBODIMENTS

Hereinafter, a manufacturing method of an optical waveguide element of the present invention will be described in details. The present inventors have studied a method capable of suppressing and adjusting DC drift by adjusting a resistance or a capacitance in a cross-sectional or surface direction inside a substrate without greatly influencing structures or characteristics which are obtained in processes after the processes are completed, in relation to resistances or capacitances in cross-sectional or surface directions of an LN substrate, a buffer layer, a Si film, and the like, which are determined in respective processes of manufacturing steps of an optical waveguide element. As a result, attention is paid to respective interfaces between the substrate, the buffer layer, the Si semiconductor film, electrodes, and the like, and, particularly, attention is paid to relevancy between an amount or a range of Li atoms present in the interface of the LN substrate and the buffer layer, and DC drift.

Figure 1:
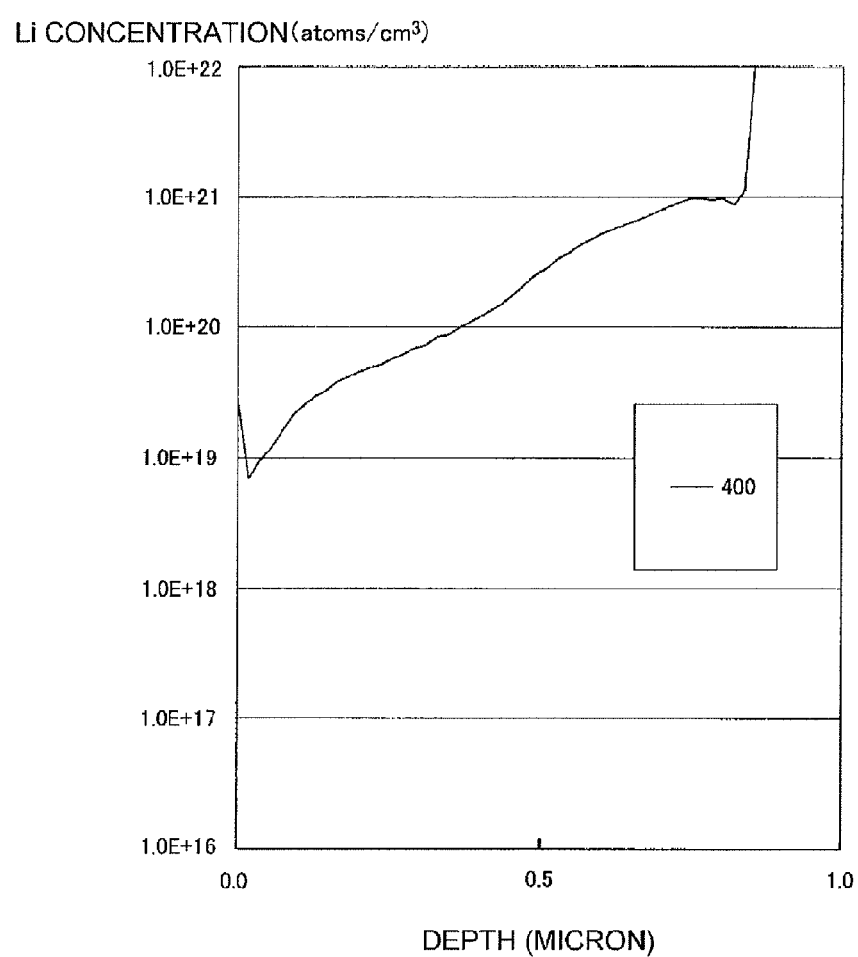
FIG. 1 illustrates an analysis example of a substrate interface vicinity using SIMS in a case where an interface diffusion layer heat adjustment step is performed at 400° C.

FIG. 1 illustrates an example in which the vicinity of an interface between an LN substrate and a buffer layer is analyzed using secondary ion-microprobe mass spectrometry (SIMS). The LN substrate used in this analysis has undergone heat adjustment at 400° C. for five hours as an interface diffusion layer heat adjustment step in addition to typical wafer processes. The longitudinal direction of the graph expresses an amount of element, and the transverse axis expresses a depth of the layers, in which 0 indicates a buffer layer surface direction, and the right side from 0 indicates an LN substrate side. Here, a part where an amount of Li rapidly increases is a boundary between the LN substrate and the buffer layer. Li atoms are distributed in a range of about 1 μm from the boundary, and this region may be regarded as an interface diffusion layer of the Li atoms.

The interface diffusion layer is expected to have a resistance and a capacitance which are different from the buffer layer ($SiO_2$) or the LN substrate depending on a presence amount or a presence region of Li. It is very difficult to directly measure a resistance value and a capacitance value of this part, and thus it is a realistic method to analogize the values from a combined resistance or a combined capacitance of a modulator or to expect the values from a behavior of DC drift.

Here, if an amount or a region of Li in this interface diffusion layer can be adjusted in relation to resistances or capacitances in cross-sectional directions and surface directions of the LN substrate, the buffer layer, the Si film, and the like, which are determined in respective processes, without greatly influencing structures or characteristics obtained in the processes, this is considered to correspond to the fact that a resistance value and a capacitance value of the interface diffusion layer can be adjusted. In other words, a behavior of DC drift can be adjusted.

As means for adjusting an amount or a region of Li in the interface diffusion layer, an interface diffusion layer heat adjustment step is introduced into the wafer process of the related art so as to adjust an amount or a presence region of Li. Therefore, it is possible to further change and adjust DC drift characteristics which are determined in respective wafer processes for forming the LN substrate including crystal quality, the buffer layer, and the Si film, electrodes, and the like.

Figure 2:
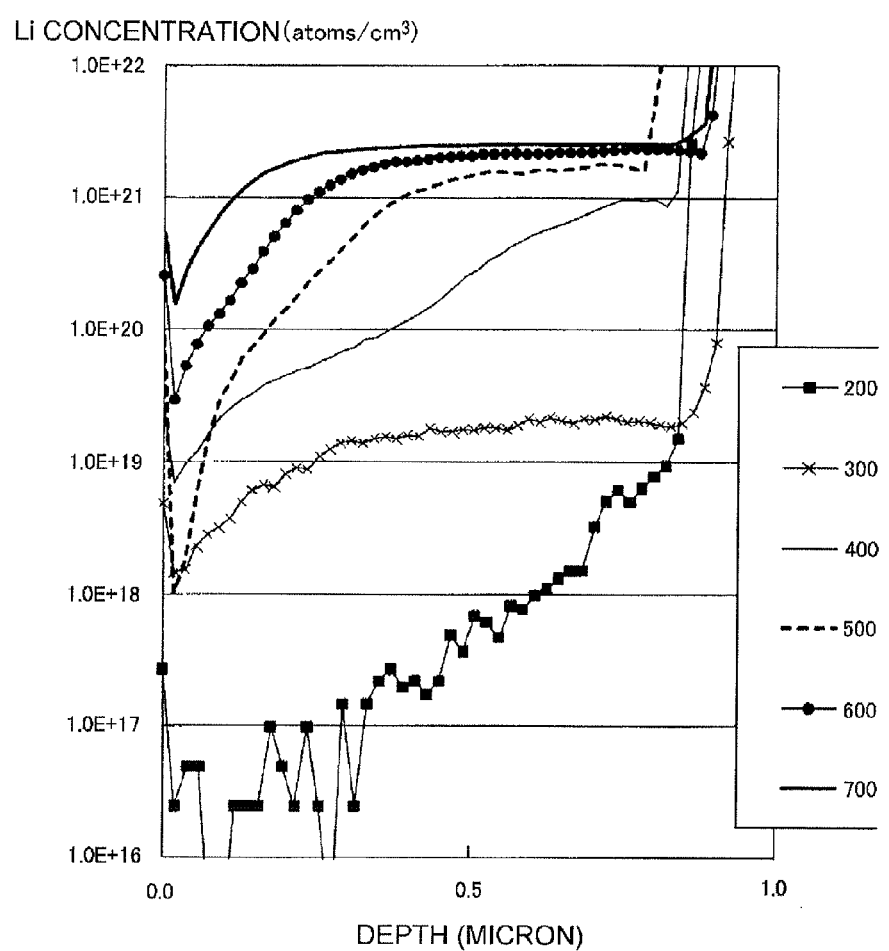
FIG. 2 is a graph illustrating a concentration distribution of Li in the vicinity of the surface interface of the substrate in a case where a temperature (200° C. to 700° C.) is changed in the interface diffusion layer heat adjustment step.

FIG. 2 illustrates a result of examining a Li amount of a boundary region between LN and the buffer layer by using the SIMS in the same manner as in the above-described analysis, by performing the interface diffusion layer heat adjustment step on each wafer having undergone a buffer layer step at various temperatures (for five hours in all cases) in accordance with the above technical feature. It can be seen that as a temperature in the interface diffusion layer heat adjustment step is changed from 200° C. to 700° C., an amount of Li in the interface between LN and the buffer layer is changed from about $1 \times 10^{16}$ (atoms/cm$^3$) to $3 \times 10^{21}$ (atoms/cm$^3$). In addition, it can be seen that a presence region of Li is adjusted to 1 μm or less. And in this concentration distribution, it is possible to effectively suppress DC drift. Further, a resistance value and a capacitance value of the interface diffusion layer region cannot be directly separated and measured, but values thereof are expected to be different since different distribution amounts and distribution regions of Li are produced.

Figure 3:
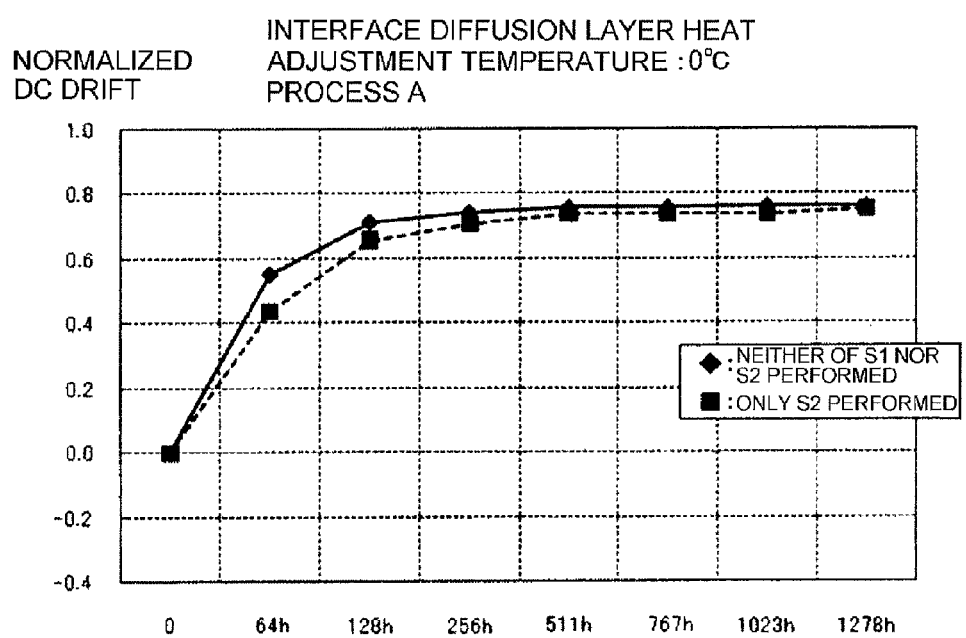
FIG. 3 is a graph illustrating a state of DC drift in a case where the interface diffusion layer heat adjustment step is not performed.
Figure 4:
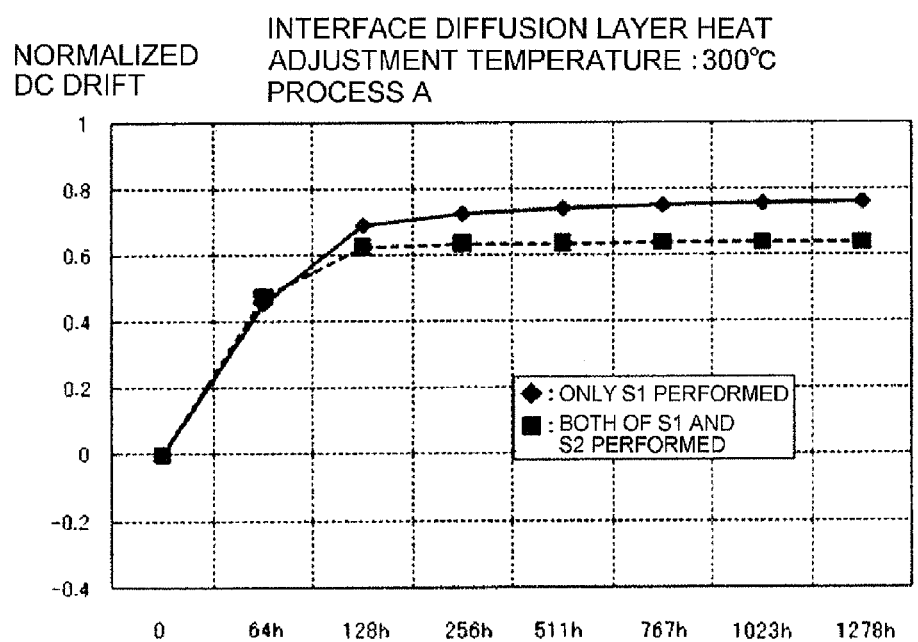
FIG. 4 is a graph illustrating a state of DC drift in a case where the interface diffusion layer heat adjustment step is performed at 300° C.
Figure 5:
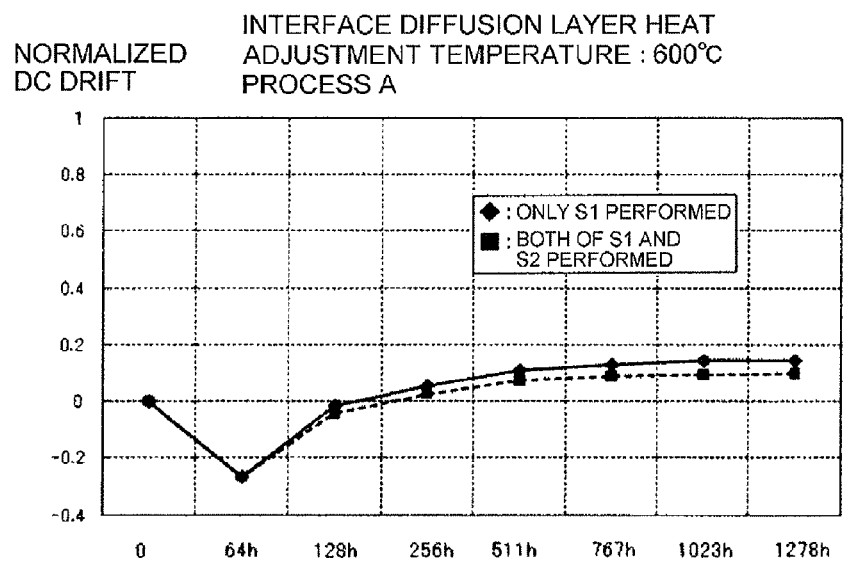
FIG. 5 is a graph illustrating a state of DC drift in a case where the interface diffusion layer heat adjustment step is performed at 600° C.

FIGS. 3 to 5 illustrate results of measuring DC drift of respective optical waveguide elements of samples which are produced from these wafers and undergo until a final step. The samples include a sample A (FIG. 3) on which the interface diffusion layer heat adjustment step is not performed (corresponding to a temperature of 0° C.), a sample B (FIG. 4) on which the interface diffusion layer heat adjustment step is performed at 300° C., and a sample C (FIG. 5) on which the interface diffusion layer heat adjustment step is performed at 600° C. It can be seen from the test data that an amount and a region of Li of the diffusion layer are changed by adjusting a temperature in the interface diffusion layer heat adjustment step, and thus a DC drift characteristic is changed in accordance with the changes. The graphs of FIGS. 3 to 5 will be described later in detail.

Therefore, after electrode design and conditions for each wafer process are determined, if an interface diffusion layer heat adjustment step which is the most suitable for the electrode design and the conditions for the wafer process is employed, it is possible to provide an optical waveguide element whose DC drift is further suppressed.

One of the most notable features is that an amount and a region of Li can be adjusted even at a temperature of about 200° C. in the interface diffusion layer heat adjustment step as can be seen from FIG. 2. This is an epochal feature which provides means for further improving/adjusting a final yield of reaching final products as a result of complicated wafer processes, after the wafer processes are completed.

In other words, this means that, in a case where the wafer processes are completely finished, a chip is cut out of a wafer, DC drift characteristics of the chip are measured, and the measured characteristics do not reach expected DC drift characteristics taking variations in the processes into account, an interface diffusion layer heat adjustment step is further additionally performed at a temperature lower than an adjustment temperature used during the wafer processes, and so it is possible to adjust finely DC drift characteristics.

In other words, coarse adjustment of DC drift characteristics which are roughly defined by process design, wafer manufacturing parameters, and materials to be used, and the like, is performed as a first interface diffusion layer heat adjustment step in the wafer processes. The deviation from an expected value of the DC drift characteristics caused by variations in manufacturing processes or variations in materials is adjusted as a second interface diffusion layer heat adjustment step on the wafer substrate or on a chip separated from the wafer. Therefore, it is possible to improve a fabrication yield, thereby suppressing manufacturing costs.

In addition, since a heating temperature in the first interface diffusion layer heat adjustment step is higher than a heating temperature in the second interface diffusion layer heat adjustment step, it is also possible that DC drift is considerably suppressed in the first interface diffusion layer heat adjustment step and finely adjusted in the second interface diffusion layer heat adjustment step in order to obtain predetermined characteristics. Further, since Li is also diffused into a cross-section of a chip in a heat adjustment step after producing the chip, excessive heating causes Li to be deficient inside a substrate. As above, it is preferable to adjust DC drift most effectively in each step.

Although a treatment temperature is different depending on a substrate state or a variety of conditions such as a method of forming a buffer layer, for example, in a case where a buffer layer is formed using a sputtering method, a suitable temperature range is 300° C. to 600° C. in the first interface diffusion layer heat adjustment step, and is 100° C. to 300° C., more preferably, 200° C. to 300° C. in the second interface diffusion layer heat adjustment step.

An amount of the DC drift is determined not only by a resistance value and a capacitance value of the interface diffusion layer but also by a ratio of the resistance value or the capacitance value relative to a resistance or a capacitance of the LN substrate and a resistance or a capacitance of the Si film. For this reason, if the LN substrate or the process for Si film and the like are different even in exactly the same interface diffusion layer, different DC drift characteristics are produced. In addition, needless to say, conditions of an interface diffusion layer heat adjustment step which is the optimum to different wafer processes are also different.

Further, it is expected that the above described amount or the presence region of Li is different depending on a film formation condition such as a density of a buffer layer, a film formation equipment, or the like, and is also different depending on a manufacturing condition of an LN substrate. However, needless to say, an amount and a range of Li of the interface diffusion layer can be additionally changed and adjusted by the interface diffusion layer heat adjustment step, different from the wafer processes of the related art.

It is clear from the content of the present invention that a region which is expressed as interface diffusion layer described in the above indicates not only a contact part between LN and the buffer layer, but also a region in the buffer layer in which a presence amount of Li is adjusted, and a region including a region in the LN substrate.

In addition, as disclosed in PTL 1, annealing is performed in a wafer process, or a process of chip treatment. However, the annealing in the related art is aimed at alleviating internal stress of a substrate or a film or reducing internal stress of a metal signal electrode. Therefore, the annealing in the related art is completely different from the technical feature of the present invention of forming an interface diffusion layer through diffusion of Li, and reducing and adjusting DC drift characteristics by adjusting those amount and region thereof in a heat adjustment step.

According to the present invention, a method of manufacturing an optical waveguide element includes a step of forming an optical waveguide in a substrate with an electro-optic effect, a step of forming a buffer layer, and a step of forming an electrode, in which an interface diffusion layer heat adjustment step for adjusting a concentration distribution of a specific substance in the buffer layer by heating is included after the buffer layer is formed.

With this configuration, for example, in the optical waveguide element which mainly uses an LN substrate having an electro-optical effect as a ferroelectric substance, relatively many Li atoms are present over a relatively wide range as a specific material in the interface between the LN substrate and the buffer layer, and a concentration distribution (a presence amount and a presence region) of the Li atoms can be adjusted in the interface diffusion layer heat adjustment step. In addition, in combination with the principle that DC drift characteristics of an optical waveguide element are changed depending on magnitudes and ratios of resistances and capacitances in cross-sectional or surface directions of a substrate, a buffer layer, a Si film, and the like, it is possible to provide an industrially useful optical waveguide element whose DC drift is further suppressed, thereby improving a production yield. Thus, it is possible to provide an optical waveguide element of which a cost is to be low.

Example

Figure 6:
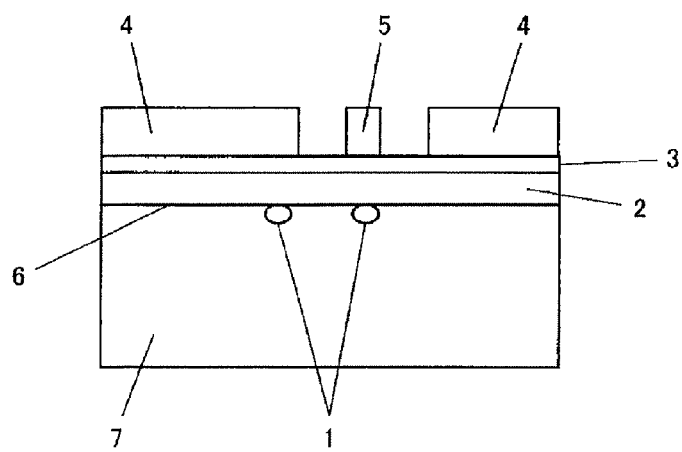
FIG. 6 is a plane view illustrating a Mach-Zehnder type optical modulator to which the present invention can be applied.
Figure 7:
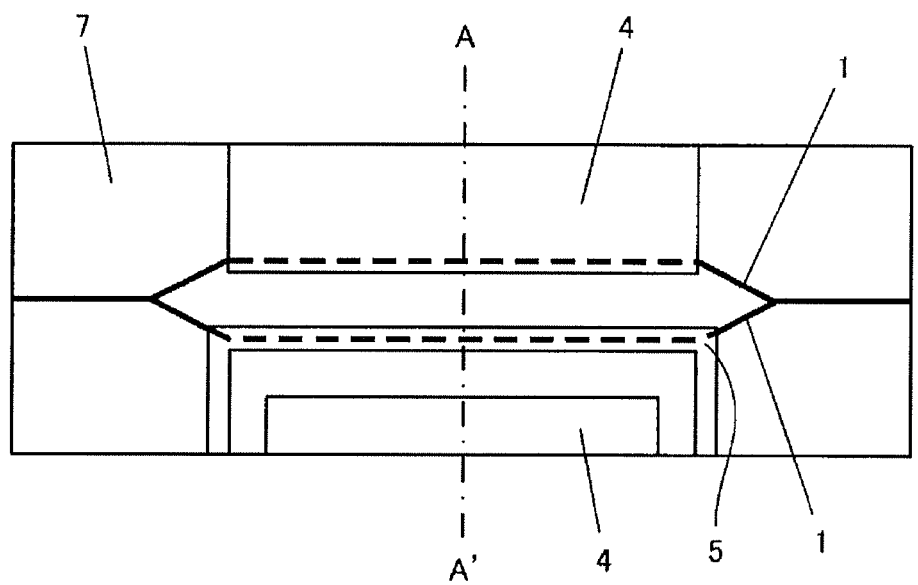
FIG. 7 is a cross-sectional view taken along the line A-A' in FIG. 6.

Hereinafter, an embodiment of the present invention will be described. FIG. 6 is a plan view illustrating an example of a Mach-Zehnder type modulator to which the present invention is applicable, and FIG. 7 is a cross-sectional view taken along the line A-A' in FIG. 6. In this Example, an optical waveguide 1 is formed in a Z cut lithium niobate (LN) substrate 7 by thermally diffusing Ti, and a signal electrode 5 and a ground electrode 4 for applying an electric field to the optical waveguide are provided thereon. Here, although not illustrated, light which is incident to the optical waveguide from a light source such as a laser is temporarily divided into two, and is modulated by a voltage applied to the signal electrode.

A buffer layer ($SiO_2$ layer) 2 is formed on the waveguide 1 which is formed through thermal diffusion of Ti, in order to reduce light absorption by the electrodes and to expand a modulation bandwidth. As a method of forming the buffer layer, sputtering, vacuum deposition, or CDV is frequently used. However, since electrical characteristics such as a film resistance and the like or mechanical characteristics such as internal stress and the like are considerably different depending on a feature of each film formation equipment or process conditions, an appropriate film formation equipment and a process conditions are selected in consideration of a wafer size, consistency with wafer processes before and after a film formation step, waveguide design, and the like. In this Example, the expression "process A" indicates that $SiO_2$ is formed with a thickness of 1.6 μm by a sputtering method.

A conductive layer, for example, a Si film 3 is formed on the wafer provided with the buffer layer 2, in order to prevent an operation point from being changed due to a pyroelectric effect of the wafer. After the Si film is formed, electrodes (4, 5) for controlling guided light are formed.

Figure 8:
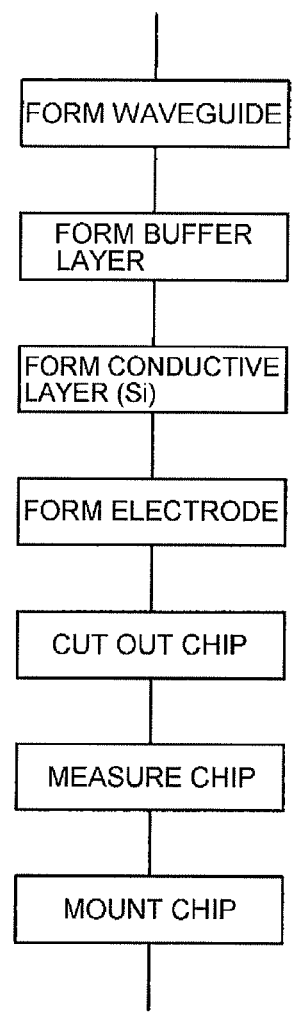
FIG. 8 is a diagram illustrating an example of a manufacturing method (process flow) of the related art.

Each chip is cut out of the wafer in which the electrodes are formed, so as to be mounted in a metal case (not illustrated), and is assembled in a state of being capable of being used as an optical waveguide element. An inspection is performed in a wafer state with regard to whether or not the wafer in which optical waveguide elements are manufactured is in a favorable state, has a problem, and the like. In addition, also in a chip state in which the wafer is cut into individual optical waveguide elements, a measurement is performed so as to preliminarily verify whether or not the chip can be mounted. Particularly, measurement items such as losses (a propagation loss of light or a coupling loss thereof) related to interaction with light, a driving voltage, an extinction ratio, and DC drift are briefly inspected in a chip state, so as to improve a production yield in accordance with modulization and to detect abnormalities of wafer processes. In many cases, these inspections are possible to be performed by sampling, not by all. This is because most of the above items have the same tendency in the same wafer. This series of processes is represented by a manufacturing method (process flow) of an optical waveguide element illustrated in FIG. 8.

Figure 9:
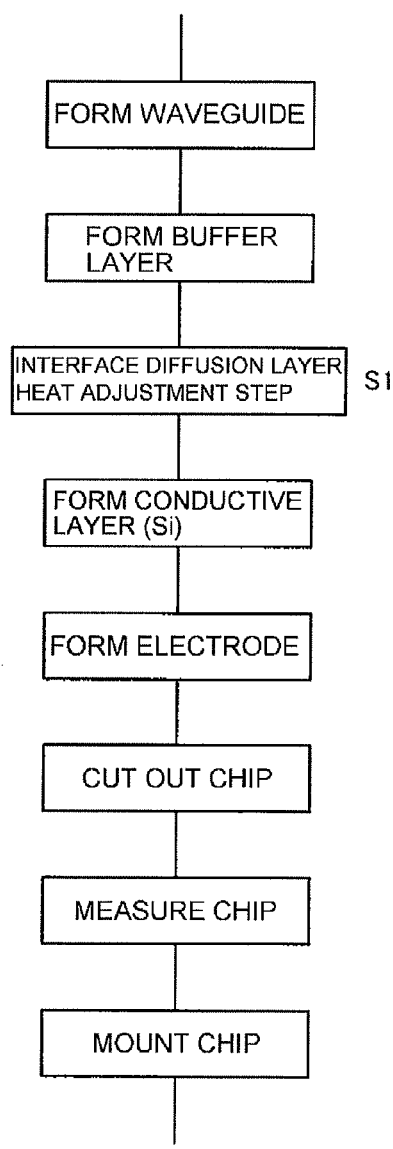
FIG. 9 is a diagram illustrating an example (first) of a manufacturing method (process flow) of the present invention.
Figure 10:
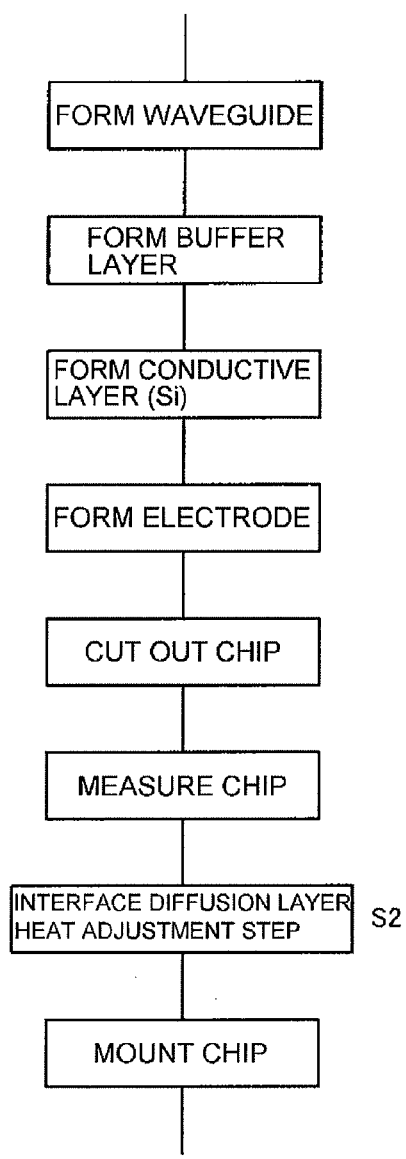
FIG. 10 is a diagram illustrating an example (second) of a manufacturing method (process flow) of the present invention.
Figure 11:
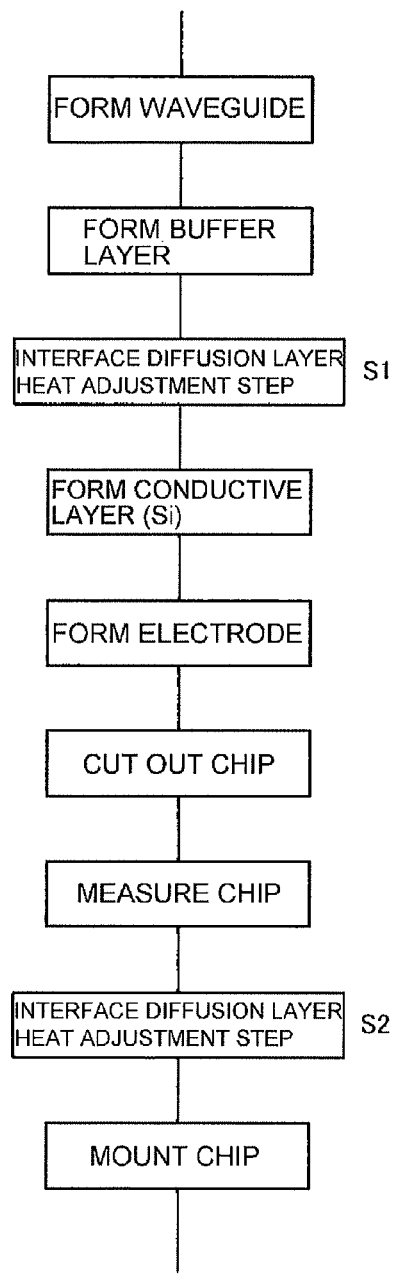
FIG. 11 is a diagram illustrating an example (third) of a manufacturing method (process flow) of the present invention.

FIGS. 9 to 11 are process flows illustrating a manufacturing method of the optical waveguide element of the present invention, in which an interface diffusion layer heat adjustment step is added to the process flow (FIG. 8) of the related art. In Example of FIG. 9, in addition to the wafer process flow of the related art, thermal treatment is performed at 600° C. for five hours newly as an interface diffusion layer heat adjustment step (Si) after a buffer layer formation step is completed.

As can be seen from the concentration distribution due to diffusion of Li in FIG. 2, Li of about $1 \times 10^{21}$ (atoms/cm³) is adjusted so as to be present over a region of about 0.7 μm in the buffer layer and the interface of LN by the thermal treatment at 600° C. Therefore, it can be seen that an amount and a distribution of Li are greatly different from a case where the interface diffusion layer heat adjustment step is not performed in the related art.

In addition, FIG. 10 illustrates another example of a manufacturing method of the optical waveguide element of the present invention, in which thermal treatment is performed at 200° C. for an hour as an interface diffusion layer heat adjustment step (S2) after a chip is cut out and characteristics of the chip are measured.

Further, FIG. 11 illustrates still another example of a manufacturing method of the optical waveguide element of the present invention, in which the interface diffusion layer heat adjustment step (S1) is performed after the buffer layer formation step is completed, and the interface diffusion layer heat adjustment step (S2) is performed after a chip is cut out and characteristics of the chip are measured.

FIGS. 3 to 5 illustrate results in which chips are respectively cut out of a wafer manufactured using the manufacturing method of the present invention and a wafer manufactured using the manufacturing method of the related art, so as to manufacture modules, and DC drift characteristics are measured. The longitudinal axis of each graph expresses a normalized DC drift amount, and the transverse axis thereof expresses elapsed time. Each graph illustrates two measurement results of a case where the interface diffusion layer heat adjustment step indicated by Si is performed and a case where interface diffusion layer heat adjustment steps indicated by S1 and S2 are performed.

As is clear from the results (FIGS. 3 to 5) of the normalized DC drift, it can be seen that the normalized DC drift (FIGS. 4 and 5) of the module to which the present invention is applied is considerably improved, and is further improved in a case where the interface diffusion layer heat adjustment step (S2) is further added after a chip is produced.

Here, FIG. 4 illustrates a result in which, after a buffer layer expressed by "process A" is formed, a wafer is manufactured by performing heat adjustment at 300° C. for five hours as the interface diffusion layer heat adjustment step (S1), and a normalized DC drift test is performed. In addition, similarly, FIG. 5 illustrates a result in which heat adjustment is performed on the buffer layer of the "process A" at 600° C. for five hours. It can be seen from FIGS. 4 and 5 that the normalized DC drift of the module to which the present invention is applied is more improved than that of the module (FIG. 3) to which the processes of the related art are applied. Further, in the above Example, the DC drift characteristics are measured after the chip is out of the wafer. However, it is needless to say that it is possible to perform the interface diffusion layer heat adjustment step in a wafer state after DC drift characteristics are measured, optically coupled by butt joint after a part of the wafer may be cut or by a prism of a high refractive index crystal such as a rutile in order to perform measurement in a wafer state.

Figure 12:
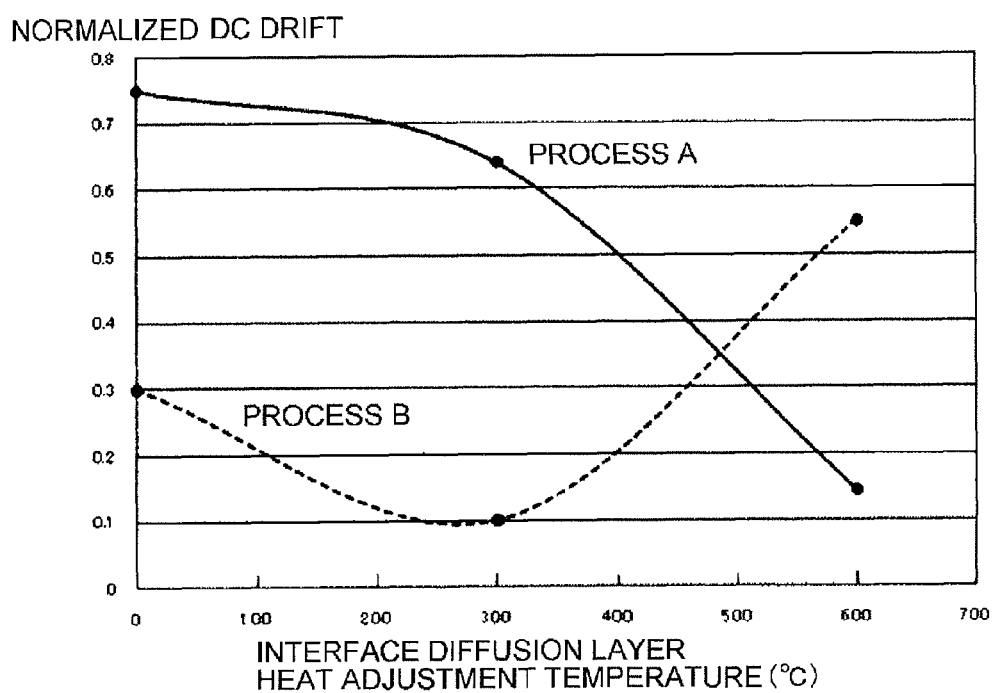
FIG. 12 is a graph illustrating a relationship between a temperature and DC drift when the interface diffusion layer heat adjustment step is performed on a buffer layer which is formed using different formation methods (process A: a sputtering method, and process B: vacuum deposition method).
Figure 13:
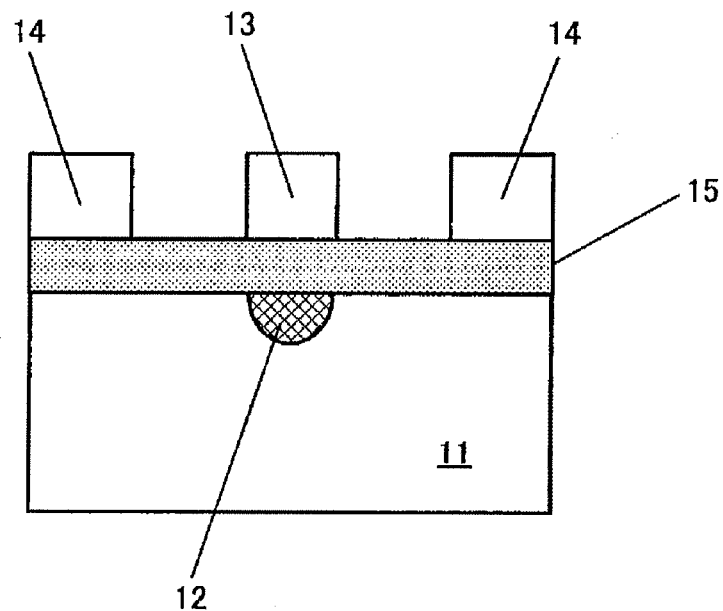
FIG. 13 is a cross-sectional view illustrating an example of an optical waveguide element of the related art.

FIG. 12 is a graph illustrating a relationship between a heat adjustment temperature of the interface diffusion layer and the normalized DC drift. From this graph, in a case where the buffer layer of the process A is formed, an optimal temperature is expected to be about 650° C. to 700° C. as an interface diffusion layer heat adjustment temperature, but a temperature lower than the temperature, for example 600° C. and the like, is preferably selected in the interface diffusion layer heat adjustment step (S1). This is aimed to make it possible to improve DC drift characteristics by using the interface diffusion layer heat adjustment step (S2) as an additional or fine adjustment even in a case where heat adjustment temperatures at which the normalized DC drift is the minimum are different due to variations in the processes or variations in wafer materials or the like.

In the above Example, although a case where $SiO_2$ is formed in a sputtering method as the "process A" has been exemplified, in a case where process design, a material, a film formation method, or the like is different, an adjustment temperature is different even if the same interface diffusion layer heat adjustment step is performed. For example, a case where $SiO_2$ is formed with a thickness of 1.2 μm by a vacuum deposition method is illustrated as a "process B" in FIG. 8. Here, an optimal value of an interface diffusion layer heat adjustment temperature at which the normalized DC drift is minimized, is about 280° C., and, in this case, a temperature of about 200° C. is selected in the interface diffusion layer heat adjustment step S1 or S2.

As mentioned above, after electrode design and a condition of each wafer process are determined, an interface diffusion layer heat adjustment step which is the most suitable for the design and the wafer process condition is employed, and thus it is possible to provide an LN modulator whose DC drift is further suppressed.

Further, although there is a case where annealing is performed in order to alleviate internal stress of a film at the buffer layer formation step of the related art in addition to the manufacturing method of the present invention, the interface diffusion layer heat adjustment step of the present invention may be performed so as to include an operation of the annealing as an application example of the present invention since a temperature in the interface diffusion layer heat adjustment step of the present invention is higher than an annealing temperature.

In addition, although, in the above Example, a description has been made of an example in which the second interface diffusion layer heat adjustment step (S2) is performed after the chip measurement is performed, it is needless to say that the second interface diffusion layer heat adjustment step may be performed before the chip measurement is performed, and then the chip measurement may be performed, from the viewpoint of stability of a wafer process, an efficient operation of production steps, or the like.

Figure 14:
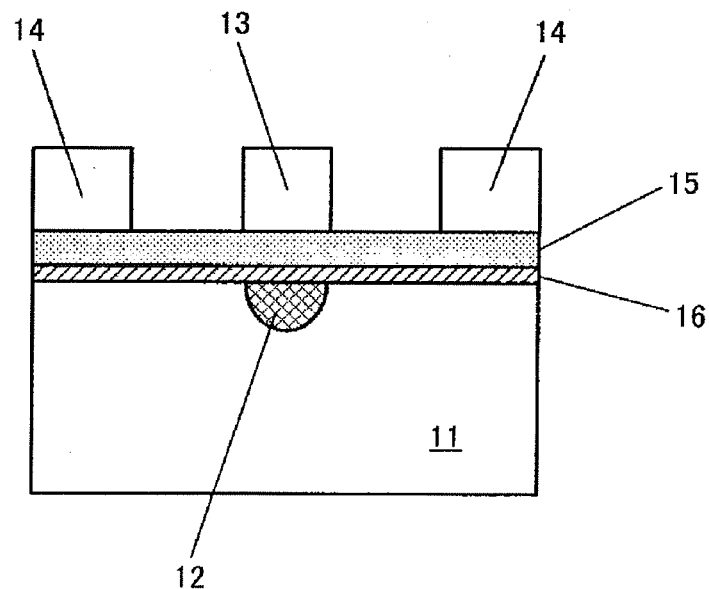
FIG. 14 is a cross-sectional view illustrating an optical waveguide element of the present invention.

Next, an optical waveguide element of the present invention will now be described in detail. As illustrated in FIG. 14, the optical waveguide element of the present invention includes a substrate 11 having an electro-optic effect, an optical waveguide 12 formed in the substrate, a buffer layer 15 which is formed on the optical waveguide and mainly made from $SiO_2$, and modulation electrodes (13, 14) which are formed on the buffer layer and modulate light waves which propagate through the optical waveguide. In addition, a region 16 in which a content of Li is $1 \times 10^{21}$ (atoms/cm$^3$) or more is formed in the buffer layer on the substrate side of the buffer layer.

A region in which a content of Li is $1 \times 10^{21}$ (atoms/cm$^3$) or more is formed in the buffer layer so that Li—O bonding is strengthened. It is possible to reduce DC drift by which movement of Li caused by electric field of modulation signal or DC bias or the like is suppressed by forming the region. Thus it is possible to stabilize characteristics of DC drift. In addition, since a content of Li can be easily controlled by controlling a temperature of thermal treatment, manufacturing steps are not complicated, and characteristics of a product can also be controlled with high accuracy.

As a substrate used in the present invention, a substrate made of a material having an electro-optic effect may be used, and a substrate made of, for example, lithium niobate, lithium tantalate, lead lanthanum zirconate titanate (PLZT), quartz crystal-based materials, and a combination of the materials, may be used. Particularly, in a case where Li is made to be contained in the buffer layer through thermal treatment, a substrate which includes rich Li such as a lithium niobate (LN) crystal is suitably used.

As a method of forming the optical waveguide in the substrate, the optical waveguide may be formed by diffusing Ti or the like into a substrate surface by using a thermal diffusion method or a proton exchange method. In addition, a ridge-shaped waveguide which has a convex shape in a portion of corresponding to the optical waveguide in the substrate, for example etching the substrate except the optical waveguide or forming grooves on both sides of the optical waveguide, is also possible to be used. In a case of the ridge shape, electric field efficiency around the waveguide is high, and thus Li is easily moved. Therefore, it is possible to suitably apply the present invention.

In the optical waveguide element, modulation electrodes such as the signal electrode 13 and the ground electrode 14 and the like are formed on the substrate 11. These electrodes may be formed by the method of forming an electrode pattern of Ti or Au or plating gold.

The buffer layer 15 is formed between the optical waveguide 12 and the modulation electrodes (13, 14). As the buffer layer, a $SiO_2$ film of about 0.5 μm to 1.0 μm is formed by a sputtering method mainly using a parallel plate type magnetron sputter with a $SiO_2$ as a target after optical waveguide is formed. Particularly, as the $SiO_2$ target, a target, which is doped with a very small amount of metal such as In or Ti for the purpose of reducing a resistance value of a film, may be used in order to stabilize characteristics of DC drift.

In the optical waveguide element of the present invention, the region in which a content of Li is $1 \times 10^{21}$ (atoms/cm$^3$) or more is formed in the buffer layer, and thus movement of Li due to an electric field is suppressed. In addition, a thickness of the region which contains Li of $1 \times 10^{21}$ (atoms/cm$^3$) or more in the buffer layer is a quarter or more of a thickness of the buffer layer, and thus it is possible to realize DC drift stability more reliably.

As a method of letting Li be contained into the buffer layer, a lithium niobate substrate or the like which is a substrate having an electro-optic effect can supply rich Li so that it is easily to let Li be contained into the buffer layer by thermal treatment performed on the entire substrate after a buffer layer which mainly includes $SiO_2$ is formed. $SiO_2$ or the like which is a material of a buffer layer, used in an optical device, has a great diffusion coefficient, and can easily diffuse Li.

In addition, in the aspect of controlling a content of Li, it can be easily controlled by a thermal treatment temperature, and Li can be sufficiently diffused at a temperature in a range of 400° C. to 1000° C. Particularly, if Li is thermally diffused at 600° C. or higher, it is possible to easily form a region which contains Li of $1 \times 10^{21}$ (atoms/cm$^3$) or more. A thermal treatment temperature is not necessarily controlled in the unit of several degrees, and Li diffusion can be controlled even in rougher temperature control.

Li is a movable ion in $SiO_2$, and resistivity or a capacitance value of the buffer layer is controlled depending on an amount of Li. Li enters into the buffer layer when no thermal treatment is performed, or at a low temperature of about 200° C., but mobility of Li in the buffer layer is different depending on a density of the buffer layer or a bonding state of Li and oxygen. In the present invention, thermal treatment is performed in an oxygen atmosphere of 400° C. to 1000° C., preferably, 600° C. or higher, and thus bonding of Li—O is strengthened, and the buffer layer becomes dense. As the result, it is possible to reduce mobility of Li, and thus it is possible to suppress movement of Li due to an electric field, which is a worse factor for DC drift.

FIGS. 15 to 18 are graphs respectively illustrating that thermal treatment is performed on a buffer layer of $SiO_2$ which is formed with a thickness of about 0.6 μm to 0.8 μm on an LN substrate, at 200° C., 500° C., 600° C., and 700° C., and respective distributions of contents of Li in the buffer layer are measured.

Figure 15:
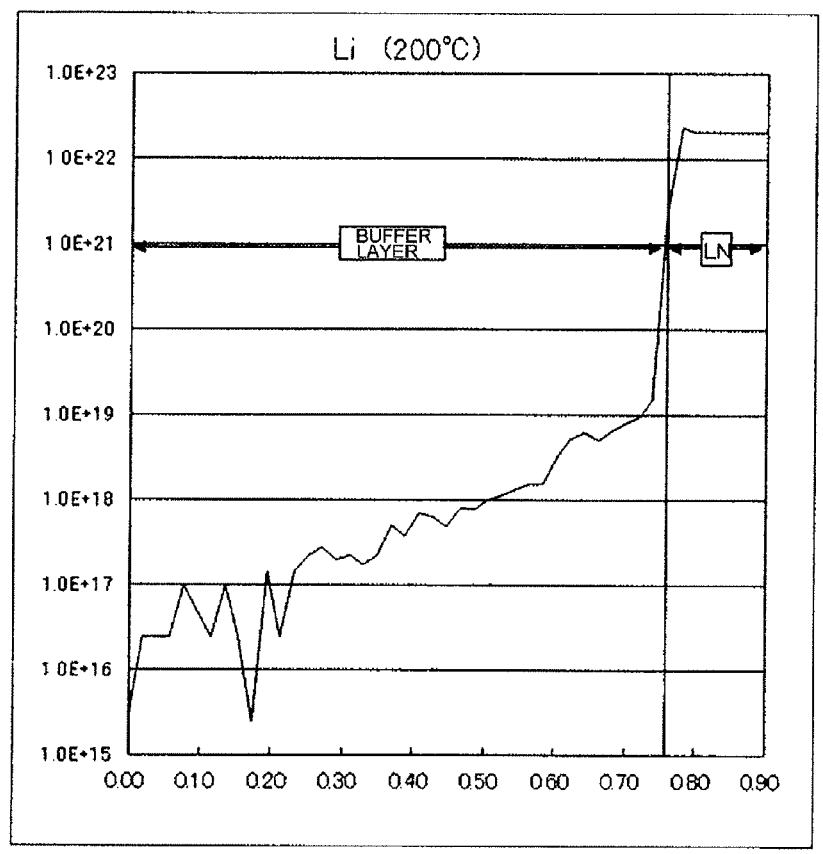
FIG. 15 is a graph illustrating distribution circumstances of Li when a thermal treatment temperature is 200° C.
Figure 16:
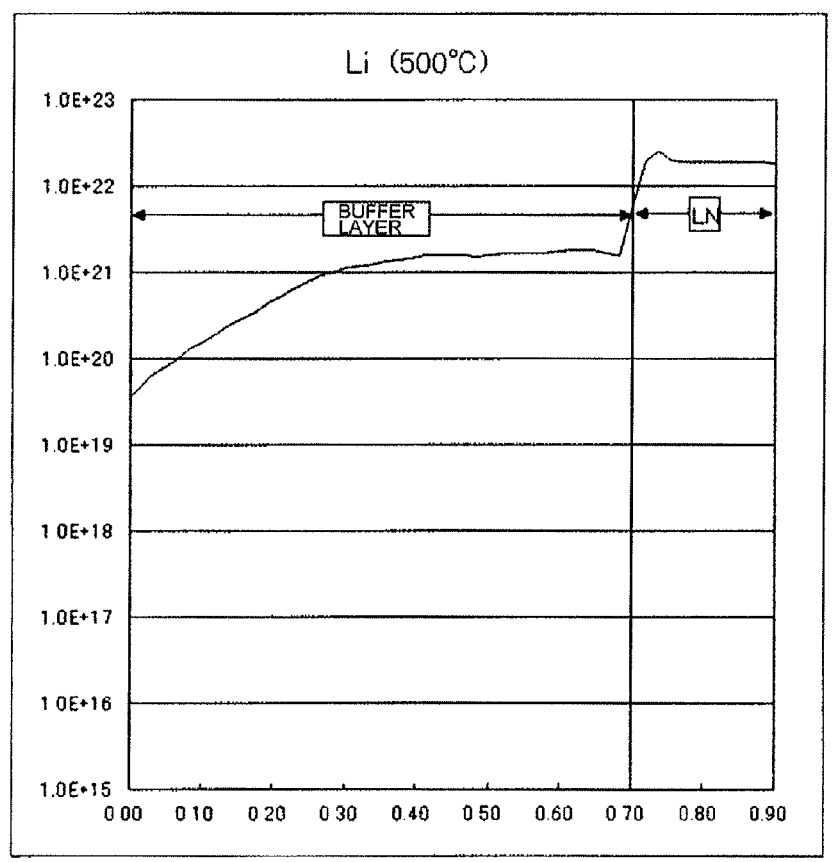
FIG. 16 is a graph illustrating distribution circumstances of Li when a thermal treatment temperature is 500° C.
Figure 17:
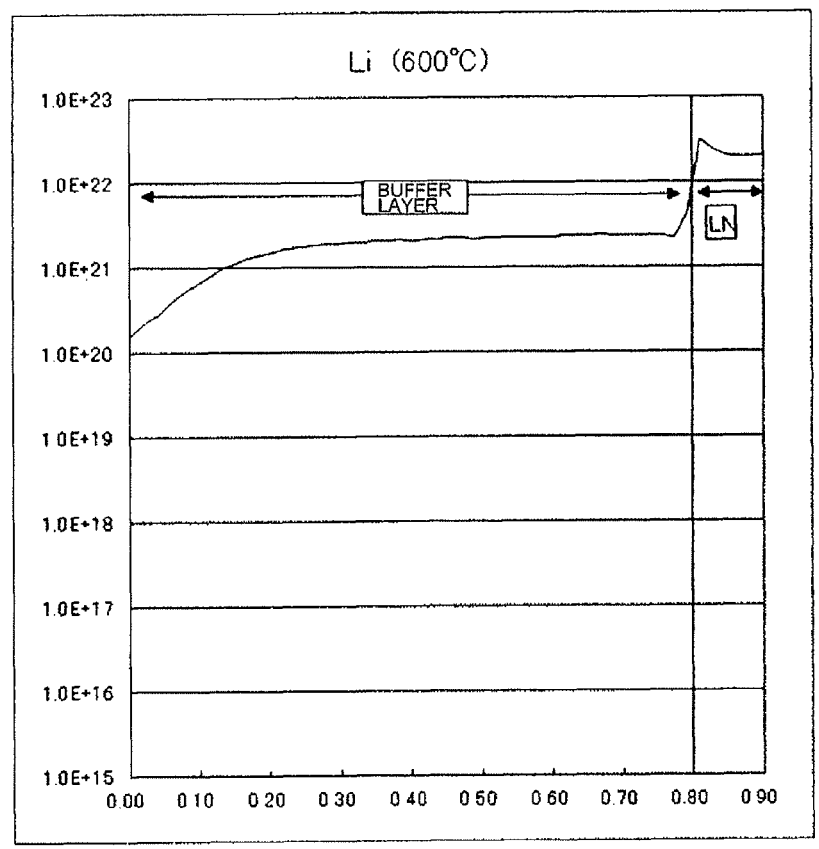
FIG. 17 is a graph illustrating distribution circumstances of Li when a thermal treatment temperature is 600° C.
Figure 18:
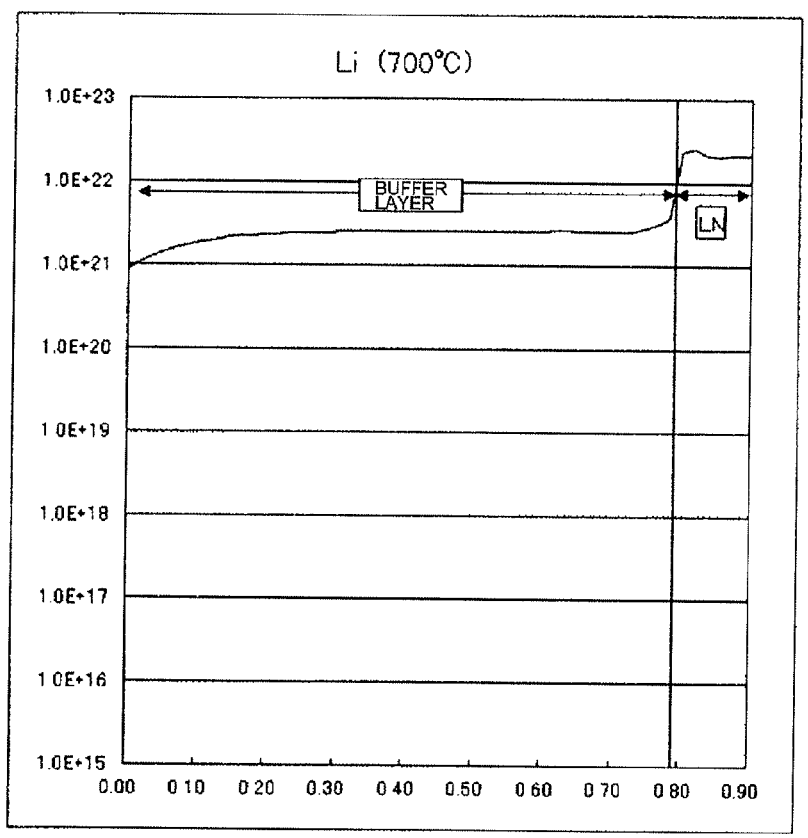
FIG. 18 is a graph illustrating distribution circumstances of Li when a thermal treatment temperature is 700° C.

FIG. 15 illustrates a case where the thermal treatment is performed at 200° C., and a content of Li in the buffer layer is $1 \times 10^{19}$ (atoms/cm$^3$) or less. FIG. 16 illustrates a case where the thermal treatment is performed at 500° C., and a region in which a content of Li in the buffer layer is $1 \times 10^{21}$ (atoms/cm$^3$) or more has a thickness of about 0.4 μm. FIG. 17 illustrates a case where the thermal treatment is performed at 600° C., and a region in which a content of Li in the buffer layer is $1 \times 10^{21}$ (atoms/cm$^3$) or more has a thickness of about 0.6 μm. FIG. 18 illustrates a case where the thermal treatment is performed at 700° C., and a region in which a content of Li in the buffer layer is $1 \times 10^{21}$ (atoms/cm$^3$) or more has a thickness of about 0.8 μm and is thus spread in almost the entire buffer layer.

Figure 19:
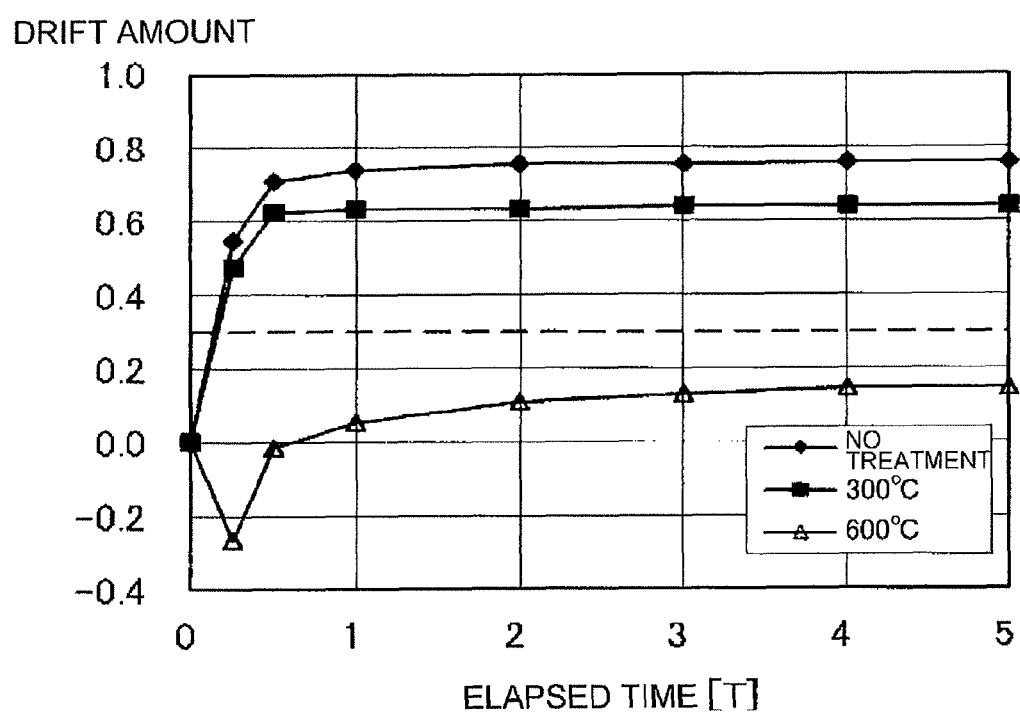
FIG. 19 is a graph illustrating variations in DC drift of optical waveguide elements in a case where thermal treatment is not performed and a case where thermal treatment is performed at 300° C. or 600° C.

FIG. 19 is a graph illustrating states of DC drift at a temperature environment of 150° C. in relation to an optical waveguide element on which thermal treatment has not been performed and optical waveguide elements on which thermal treatment has been performed at 300° C. or 600° C. Comparing with the optical waveguide element on which thermal treatment has not been performed and the optical waveguide element on which thermal treatment has been performed at 300° C., the optical waveguide element on which thermal treatment has been performed at 600° C. shows reduced DC drift under the same test environment, and thus it can be easily understood that characteristics thereof are stabilized. As a result of performing the same test, a reduction of DC drift can be observed in a case where thermal treatment is performed at 400° C. or higher. Particularly, in a case of 600° C. or higher, almost the same result can be obtained. In addition, in a case of over 1000° C., a diffusion effect of Li has no difference, and, on the contrary, harmful effects such as progress of diffusion of Ti occur since an optical waveguide is formed using thermal diffusion of Ti.

As a method of letting Li be contained in the buffer layer, the buffer layer is subjected to the thermal treatment in the atmosphere in which a material including rich Li such as LiCl or $Li_2O$ is placed, and thus Li can also be accelerated to penetrate into the buffer layer from the surface of the buffer layer. Therefore, it is possible to efficiently manufacture an optical waveguide element having stabilized characteristics of DC drift.

In addition, after the optical waveguide is formed in the substrate, the buffer layer made mainly from $SiO_2$ as a main material is formed thereon by a vacuum film formation method such as a sputtering method, a deposition method, or a CVD method. Particularly, the buffer layer is preferably formed by the sputtering method. When the buffer layer is formed, a film formation material, for example, a target of the sputtering method may be mixed with a material including Li such as $Li_2O$ so that a content of Li in the buffer layer becomes $1 \times 10^{21}$ (atoms/cm$^3$) or more. Li can be contained in advance when the buffer layer is formed, and thus manufacturing steps can be simplified and it is possible to efficiently manufacture an optical waveguide element having stabilized characteristics of DC drift.

INDUSTRIAL APPLICABILITY

As explained above, according to the present invention, there is provided a manufacturing method of an optical waveguide element whose DC drift is suppressed, and it is possible to provide a manufacturing method of an optical waveguide element, which makes possible to adjust DC drift in the middle of manufacturing process so that it improves a fabrication yield. In addition, according to the present invention, it is possible to provide an optical waveguide element and a method of manufacturing the same, capable of stabilizing DC drift, not making difficulty in production processes, and controlling characteristics of a product with high accuracy.

REFERENCE SIGNS LIST

1 Optical waveguide
2 Buffer layer
3 Si film
4 Ground electrode
5 Signal electrode
6 Substrate/buffer layer boundary surface
7 Substrate
S1 First interface diffusion layer heat adjustment step
S2 Second interface diffusion layer heat adjustment step
11 Substrate having electro-optic effect
12 Optical waveguide
13 Signal electrode
14 Ground electrode
15 Buffer layer
16 Li containing region

The invention claimed is:
1. An optical waveguide element comprising:
a substrate having an electro-optic effect;
an optical waveguide formed in the substrate;
a buffer layer formed on the optical waveguide and made mainly from $SiO_2$; and a modulation electrode formed on the buffer layer and modulating light waves which propagate through the optical waveguide, wherein the buffer layer has a region which contains Li of $1\times10^{21}$ (atoms/cm$^3$) or more at a substrate side of the buffer layer, and a thickness of the region which contains Li of $1\times10^{21}$ (atoms/cm$^3$) or more in the buffer layer is a quarter or more of a thickness of the buffer layer.

2. The optical waveguide element according to claim 1, wherein the buffer layer is doped with at least one of In and Ti.

* * * * *